United States Patent
Kim et al.

(10) Patent No.: US 9,744,842 B2
(45) Date of Patent: Aug. 29, 2017

(54) DEVICE AND METHOD FOR LEARNING ENGINE CLUTCH CONTACT POINT OF HYBRID VEHICLE

(71) Applicant: Hyundai Motor Company, Seoul (KR)

(72) Inventors: Do Hee Kim, Gyeonggi-do (KR); Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 14/922,121

(22) Filed: Oct. 24, 2015

(65) Prior Publication Data

US 2017/0009825 A1     Jan. 12, 2017

(30) Foreign Application Priority Data

Jul. 8, 2015 (KR) .................. 10-2015-0096960

(51) Int. Cl.
| | |
|---|---|
| *B60W 10/02* | (2006.01) |
| *B60K 6/387* | (2007.10) |
| *F16D 48/06* | (2006.01) |
| *B60K 6/442* | (2007.10) |

(52) U.S. Cl.
CPC ............ *B60K 6/387* (2013.01); *F16D 48/06* (2013.01); *B60K 6/442* (2013.01); *B60Y 2200/92* (2013.01); *B60Y 2300/182* (2013.01); *B60Y 2300/427* (2013.01); *B60Y 2400/42* (2013.01); *F16D 2500/1045* (2013.01); *F16D 2500/1066* (2013.01); *F16D 2500/10412* (2013.01); *F16D 2500/3065* (2013.01); *F16D 2500/30421* (2013.01); *F16D 2500/30426* (2013.01); *F16D 2500/50245* (2013.01); *F16D 2500/50251* (2013.01); *F16D 2500/50275* (2013.01); *F16D 2500/70442* (2013.01);
(Continued)

(58) Field of Classification Search
CPC ...... B60W 10/02; B60W 20/00; B60W 20/40; B60W 2710/027; B60W 2710/0666; B60W 10/08; Y10S 903/906; Y10S 903/914; Y10S 903/946; B60Y 2200/92; B60Y 2300/427; B60Y 2300/43; F16D 48/08
USPC .................. 701/22; 180/65.265; 903/902
See application file for complete search history.

(56) References Cited

U.S. PATENT DOCUMENTS

| | | | | |
|---|---|---|---|---|
| 4,629,045 A | * | 12/1986 | Kasai ............... | F16D 48/066 192/3.58 |
| 6,711,486 B1 | * | 3/2004 | Karlsson ............ | F16D 48/06 477/166 |

(Continued)

FOREIGN PATENT DOCUMENTS

| | | |
|---|---|---|
| JP | 2564643 B2 | 9/2004 |
| JP | 2008-256189 A | 10/2008 |

(Continued)

*Primary Examiner* — Dalena Tran
(74) *Attorney, Agent, or Firm* — Mintz Levin Cohn Ferris Glovsky and Popeo, P.C.; Peter F. Corless (57) ABSTRACT

A method for learning a contact point of an engine clutch configured to control connection of power between an engine and a motor of a hybrid vehicle is provided. The method includes performing a first learning of the contact point of the engine clutch by increasing a contact speed of the engine clutch and storing information of a first contact point learned by the first learning. A second learning of the contact point of the engine clutch is then performed by decreasing the contact speed of the engine clutch.

5 Claims, 6 Drawing Sheets

(52) U.S. Cl.
CPC . *F16D 2500/70605* (2013.01); *Y10S 903/914* (2013.01); *Y10S 903/946* (2013.01)

(56) References Cited

U.S. PATENT DOCUMENTS

| | | | | |
|---|---|---|---|---|
| 2012/0271523 | A1* | 10/2012 | Sardari Iravani | B60T 7/122 701/70 |
| 2014/0136066 | A1* | 5/2014 | Cho | F16D 48/06 701/68 |
| 2015/0197245 | A1* | 7/2015 | West | B60W 10/02 701/22 |

FOREIGN PATENT DOCUMENTS

| | | |
|---|---|---|
| JP | 2010-276117 A | 12/2010 |
| JP | 2013-035403 A | 2/2013 |
| JP | 2014-213704 A | 11/2014 |
| KR | 10-2015-0036065 | 4/2015 |

* cited by examiner

RELATED ART

DEVICE AND METHOD FOR LEARNING ENGINE CLUTCH CONTACT POINT OF HYBRID VEHICLE

CROSS-REFERENCE TO RELATED APPLICATION

This application claims priority to and the benefit of Korean Patent Application No. 10-2015-0096960 filed in the Korean Intellectual Property Office on Jul. 8, 2015, the entire contents of which are incorporated herein by reference.

BACKGROUND (a) Field of the Invention

The present invention relates to a device and a method for learning an engine clutch contact point of a hybrid vehicle.

(b) Description of the Related Art

Recently, global environmental contamination has increasingly become a concern, and thus use of clean energy is becoming more important. Particularly, air pollution in major cities is becoming more severe, and exhaust gas of a vehicle is one of main causes of the air pollution. To solve the problem of exhaust gas and to reduce fuel consumption, an environmentally-friendly vehicle including a hybrid vehicle and an electric vehicle has been developed.

The hybrid vehicle has a power generation device formed with an engine and a motor, and is driven by appropriately using each of power developed by a combustion action of the engine and power generated by a rotation of a motor using electrical energy stored in a battery. In the hybrid vehicle, a transmission of a Transmission Mounted Electric Device (TMED) method that connects a driving motor and a transmission is generally applied. In the hybrid vehicle, to transfer power of the engine to a driving shaft, an engine clutch is mounted between the engine and the driving motor.

The hybrid vehicle provides an electric vehicle (EV) mode that in which the vehicle in run with a torque of a driving motor and a hybrid electric vehicle (HEV) mode in which the vehicle is run with the sum of an engine torque and a driving motor torque based on whether coupling of the engine clutch occurs. When the hybrid vehicle is converted from an EV mode to an HEV mode, after an engine speed and a motor speed are synchronized, in a power delivery process between the engine and the driving motor which are different power sources, by coupling the engine clutch thus preventing a torque from being changed, drivability can be secured.

Further, in the hybrid vehicle, a contact point learning of the engine clutch is important for stable power delivery. A dry engine clutch and a wet engine clutch are sensitive to temperature, so continuous learning may be needed. Particularly, with the dry engine clutch it is important to perform frequently learning, since the contact point of the dry engine clutch varies based on the temperature. Learning precision is increased when contact of the engine clutch or learning of the contact point is slowly performed, but learning of a contact point is stopped or cancelled based on a driving condition. When the contact or the contact of the engine clutch or the learning of the contact point is performed rapidly, learning cancelation may be decreased, but the learning precision may also be decreased.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a device and a method for learning an engine clutch contact point of a hybrid vehicle having advantages of learning a contact point of the engine clutch.

An exemplary embodiment of the present invention provides a method for learning a contact point of an engine clutch configured to control connection of power between an engine and a motor of a hybrid vehicle and may include: performing first learning of the contact point of the engine clutch by increasing a contact speed of the engine clutch; storing information of a first contact point learned by the first learning; and performing second learning of the contact point of the engine clutch by decreasing the contact speed of the engine clutch.

The method may further include deleting information of the first contact point, and storing information of a second contact point learned by the second learning. The storing of the information of the second contact point may include maintaining the information of the first contact point when the second learning is stopped or cancelled. A learning speed of the first learning may be faster than a learning speed of the second learning, and learning precision of the second learning may be greater than learning precision of the first learning. The method may further include starting the first learning when a next driving cycle is started.

The performing of the first learning or the performing of the second learning may include measuring a load of the engine by motor speed control, performing contact of the engine clutch when the motor speed control is stabilized, and determining the contact point of the engine clutch when a change of a motor speed or a motor torque is detected.

An exemplary embodiment of the present invention provides a device for learning an engine clutch contact point of a hybrid vehicle that may include: a power source having an engine and a driving motor; an engine clutch disposed between the engine and the driving motor to selectively connect the engine and the driving motor; and a vehicle controller configured to release or engage the engine clutch to implement a driving mode wherein the vehicle controller may be configured to perform first learning of a contact point of the engine clutch, and perform second learning of the contact point of the engine clutch.

The vehicle controller may include a learning unit configured to learn the contact point of the engine clutch by increasing a contact speed of the engine clutch or decreasing the contact speed of the engine clutch, and a storage unit configured to store information of the contact point learned by the learning unit. The learning unit may be configured to perform the first learning by increasing the contact speed of the engine clutch, and perform the second learning by decreasing the contact speed of the engine clutch. A learning speed of the first learning may be faster than a learning speed of the second learning, or learning precision of the second learning may be greater than learning precision of the first learning.

Further, the storage unit may be configured to store information of a first contact point learned by the first learning, or store information of a second contact point learned by the second learning. The storage unit may be configured to delete the information of the first contact point, and store the information of the second contact point to update the information stored therein. The storage unit may further be configured to maintain the information of the first contact point when the second learning is stopped or cancelled. The vehicle controller may be configured to start the first learning when a next driving cycle is started.

According to the present invention for achieving the object, by performing rapid learning and more precise learning and storing the information of the contact point learned by the exact learning, and storing the information of the contact point learned by the fast learning when the exact learning is cancelled, it may be possible to prevent omitting of the learning and improve learning accuracy.

BRIEF DESCRIPTION OF THE DRAWINGS

The objects, features and advantages of the present invention will be more apparent from the following detailed description in conjunction with the accompanying drawings, in which.

DETAILED DESCRIPTION

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuel derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A device and a method for learning an engine clutch contact point of a hybrid vehicle will now be described with reference to FIG. 1 to FIG. 6.

Figure 1:
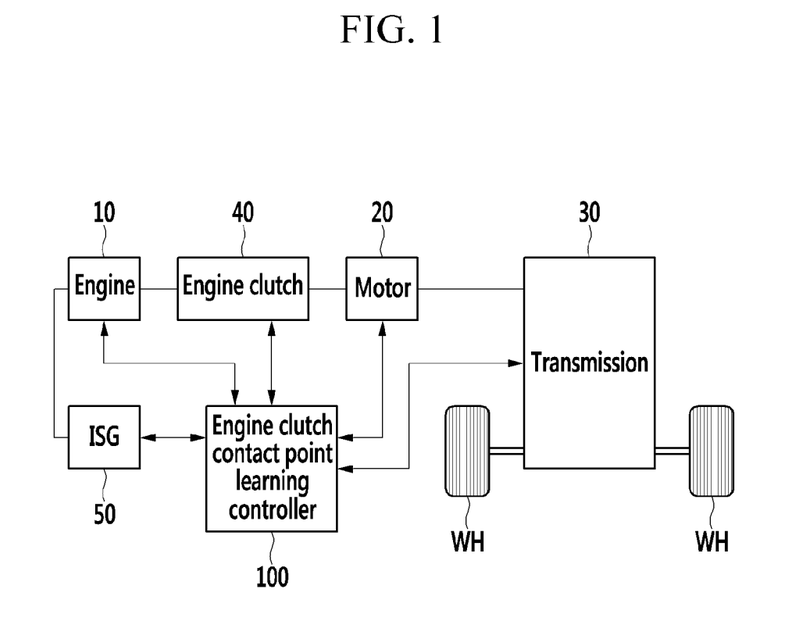
FIG. 1 is a diagram of a device for learning an engine clutch contact point of a hybrid vehicle according to an exemplary embodiment of the present invention.

FIG. 1 is a schematic diagram of a device for learning an engine clutch contact point of a hybrid vehicle according to an exemplary embodiment of the present invention. In particular, for convenience of explanation, a configuration of the device for learning an engine clutch contact point of a hybrid vehicle according to the exemplary embodiment of the present invention is schematically illustrated, but the device for learning an engine clutch contact point of a hybrid vehicle is not limited thereto.

The device for learning the engine clutch contact point of the hybrid vehicle according to an exemplary embodiment of the present invention may be configured to learn a contact point of an engine clutch 40 for coupling or releasing an engine 10 and a motor 20 for traveling in an electric vehicle (EV) mode or a hybrid electric vehicle (HEV) mode of the hybrid vehicle. The EV mode is a mode of a true electric vehicle using power of the motor 20, and the HEV mode is a mode using torque of the motor 20 as auxiliary power while using torque of the engine 10 as main power.

The device for learning the engine clutch contact point of the hybrid vehicle according to an exemplary embodiment of the present invention may be installed in a hybrid vehicle including an engine 10 and a motor 20 of the hybrid vehicle, a transmission 30 configured to shift a driving torque of the engine 10 and the motor 20 to transfer or intercept the driving torque to a wheel (WH), an engine clutch 40 disposed between the engine 10 and the motor 20 to couple or release the engine 10 and the motor 20, and an integrated starter & generator (ISG) 50 configured to start the engine 10 or generate electricity.

The device for learning the engine clutch contact point of the hybrid vehicle according to an exemplary embodiment of the present invention may include an engine clutch contact point learning controller 100, as shown in FIG. 1. For such an object, the engine clutch contact point learning controller 100 may be implemented with at least one processor operating by a predetermined program, and the predetermined program may be programmed to perform each step according to a method for learning the engine clutch contact point according to an exemplary embodiment of the present invention.

In an exemplary embodiment of the present invention, the engine clutch contact point learning controller 100 may be formed, for example, in a form including a hybrid control unit (HCU) configured to operate a hybrid vehicle, or in a form that is included in the HCU as another example. The engine clutch contact point learning controller 100 may include a vehicle controller configured to release or engage of the engine clutch to implement a driving mode.

The engine clutch contact point learning controller 100 may further be configured to perform first learning of a contact point of the engine clutch 40 by increasing a contact speed of the engine clutch 40, and perform second learning of the contact point of the engine clutch 40 by decreasing the contact speed of the engine clutch 40. A learning speed of the first learning may be faster than a learning speed of the second learning, and learning precision of the second learning may be greater than learning precision of the first learning. Further, the engine clutch contact point learning controller 100 according an exemplary embodiment of the present invention may include a learning unit (not shown) and a storage unit (not shown) both executed by the controller 100. The learning unit may be configured to learn the contact point of the engine clutch 40 by increasing a contact speed of the engine clutch 40, or learn the contact point of the engine clutch 40 by decreasing the contact speed of the engine clutch 40.

The storage unit may be configured to store information regarding the contact point of the engine clutch 40 learned by the learning unit. The storage unit may further be configured to store information regarding a first contact point learned by the first learning, or store information regarding a second contact point learned by the second learning. The storage unit may be configured to delete information of the first contact point learned by the first learning, and then store information of the second contact point learned by the second learning. The storage unit may be configured to maintain the information of the first contact point when the second learning is stopped or cancelled. When a next driving cycle is started after the second learning is complete, the engine clutch contact point learning controller 100 may be configured to restart from the first learning. The engine clutch contact point learning controller 100 may be configured to restart from the first learning when the next driving cycle is started although the second learning is not complete.

Figure 2:
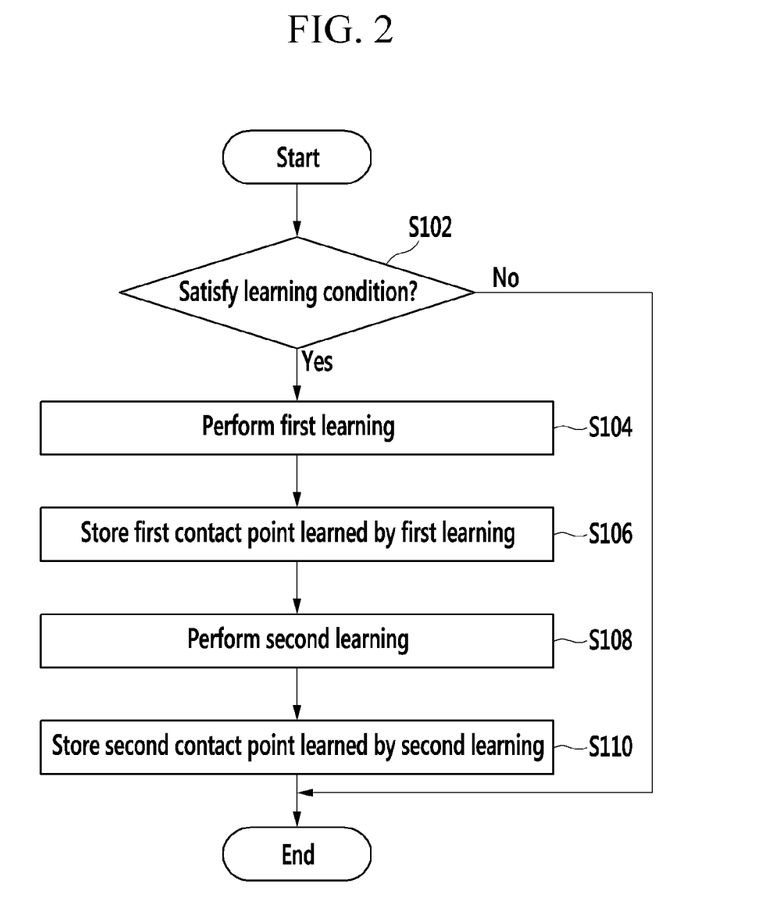
FIG. 2 is a flowchart briefly showing a process for learning a contact point of an engine clutch according to an exemplary embodiment of the present invention.

FIG. 2 is a flowchart briefly showing a process for learning a contact point of an engine clutch according to an exemplary embodiment of the present invention. The following flowchart will be described with the same reference numerals as those of the configuration of FIG. 1. Referring to FIG. 2, when a learning condition for contact point learning of the engine clutch is satisfied, the engine clutch contact point learning controller 100 may be configured to perform first learning of the contact point at steps S102 and S104. The learning condition may include states in which the HEV mode is ready, or the speed is stabilized by motor speed control.

The engine clutch contact point learning controller 100 may be configured to measure an engine load by the motor speed control when the learning condition is satisfied. The engine clutch contact point learning controller 100 may further be configured to perform contact of the engine clutch when the motor speed control is stabilized, and determine a contact control command (e.g., a pressure value or a current value) as the contact point when a change of a motor speed or a motor torque is detected. The engine may be an in off state or a speed control state in an on state. The speed control may improve the reliability of a measurement value when the engine load is measured at the motor.

When the first learning is complete, the engine clutch contact point learning controller 100 may be configured to store information of a first contact point learned by the first learning at step S106. The engine clutch contact point learning controller 100 may then be configured to perform the second learning, and store information of a second contact point by the second learning at step S108 and S110. The engine clutch contact point learning controller 100 may be configured to delete the information of the first contact point learned by the first learning, and then update the information by storing the information of the second contact point learned by the second learning. When the second learning is stopped or cancelled, the information of the first contact point may not be deleted, and the engine clutch contact point learning controller 100 may be configured to maintain the information of the first contact point.

Figure 3:
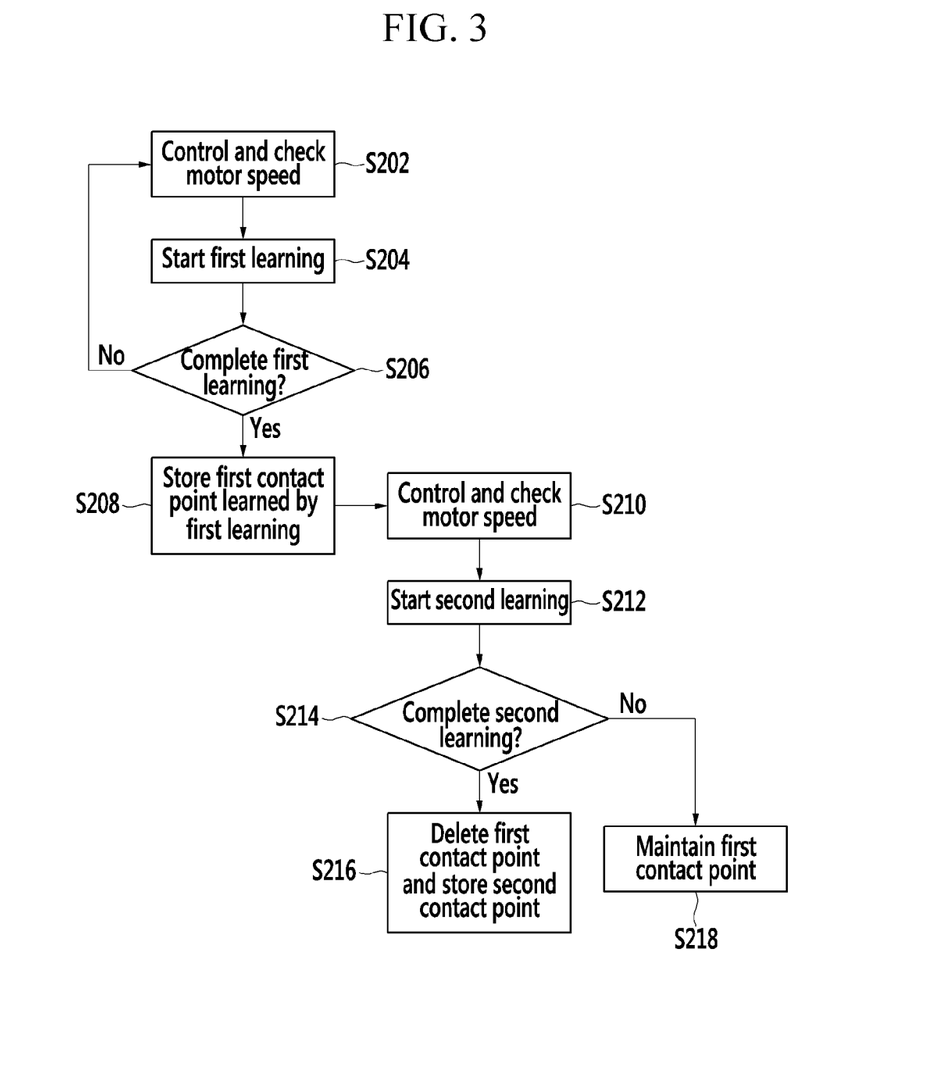
FIG. 3 is a detailed flowchart showing a process for learning a contact point of an engine clutch according to an exemplary embodiment of the present invention.

FIG. 3 is a detailed flowchart showing a process for learning a contact point of an engine clutch according to an exemplary embodiment of the present invention. The following flowchart will be described with the same reference numerals as those of the configuration of FIG. 1. Referring to FIG. 3, the engine clutch contact point learning controller 100 may be configured to adjust a motor speed, and start the first learning when the motor speed is stabilized at steps S202 and S204.

The engine clutch contact point learning controller 100 may be configured to store the information of the first contact point learned by the first learning when the first learning is complete at steps S206 and S208. Additionally, the engine clutch contact point learning controller 100 may be configured to adjust the motor speed and detect the stabilization of the motor speed after the first learning is complete at step S210. The engine clutch contact point learning controller 100 may then be configured to start the second learning after the first learning is complete and the motor speed is stabilized at step S212.

The engine clutch contact point learning controller 100 may be configured to store the information of the second contact point when the second learning is complete at steps S214 and S216. The engine clutch contact point learning controller 100 may be configured to delete the information of the first contact point, and then store the information of a second contact point learned by the second learning. When the second learning is stopped or cancelled, the information of the first contact point may not be deleted, and the engine clutch contact point learning controller 100 may be configured to maintain the information of the first contact point at step S218.

Figure 4:
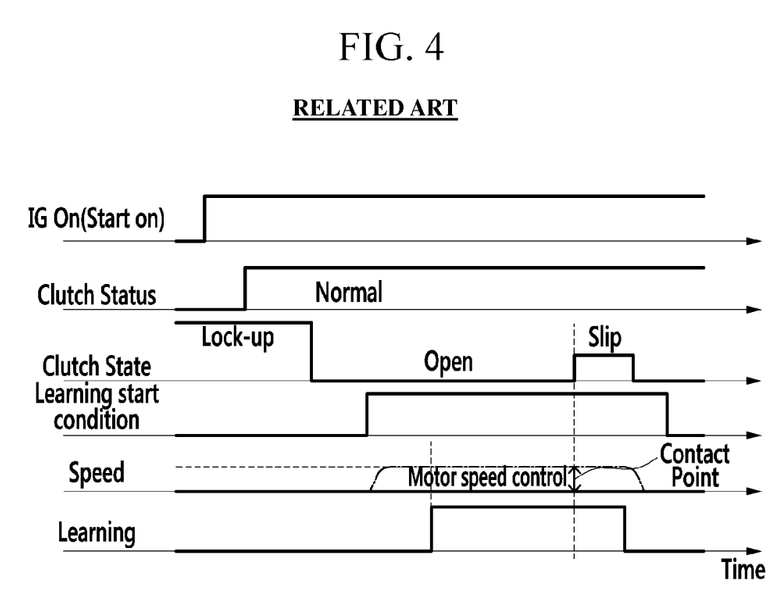
FIG. 4 is a diagram showing an example for learning the contact point of the engine clutch according to the related art.

FIG. 4 is a diagram showing an example for learning the contact point of the engine clutch according to the related art. As shown in FIG. 4, contact point learning of the engine clutch is conducted at a predetermined contact speed according to the relate art. In particular, learning precision is variable based on a learning speed of the contact point. When the contact point is learned at a substantially high speed, the learning precision may be decreased. When the contact point is learned at a substantially low speed, the learning precision is increased, but the learning may be stopped or cancelled by a driving condition while the learning is being performed.

Figure 5:
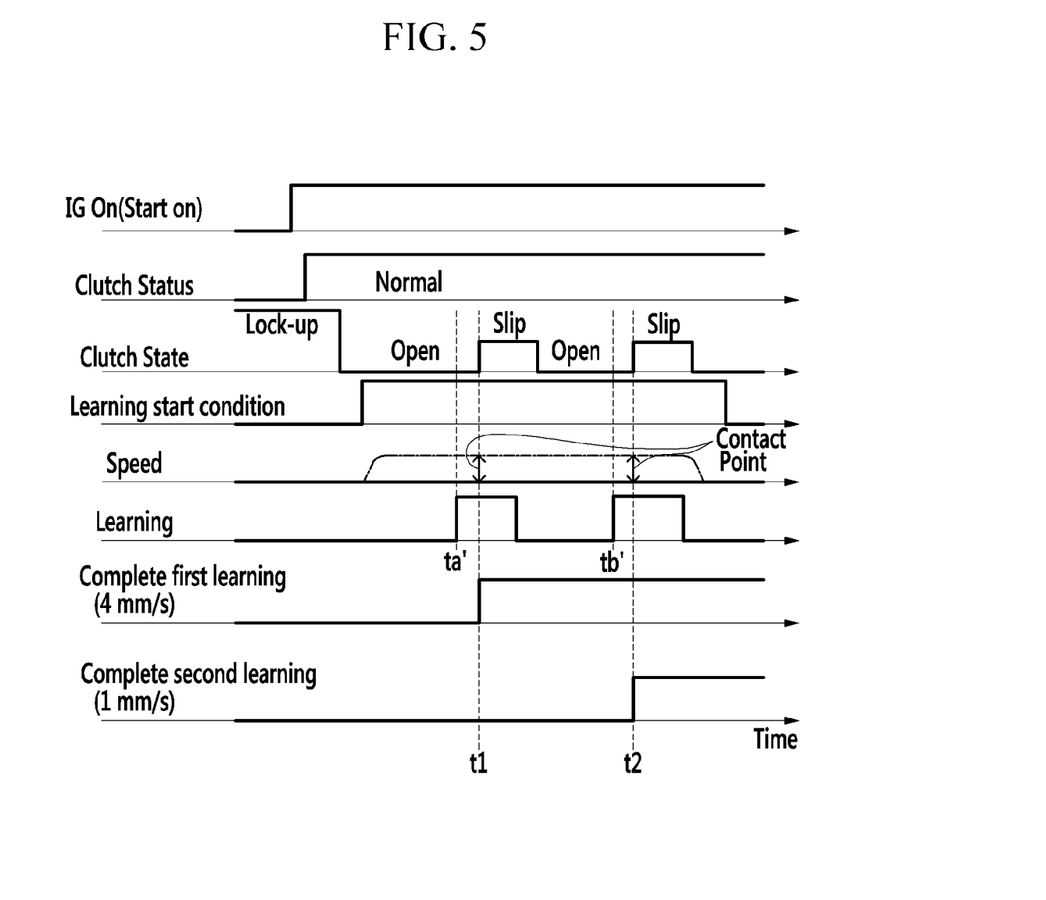
FIG. 5 is a diagram showing an example for learning the contact point of the engine clutch according to an exemplary embodiment of the present invention.

FIG. 5 is a diagram showing an example for learning the contact point of the engine clutch according to an exemplary embodiment of the present invention. Referring to FIG. 5, the engine clutch contact point learning controller 100 according to an exemplary embodiment of the present invention may be configured to start the first learning (e.g., learning at about 4 mm/s) after the time ta' at which the motor speed is stabilized, and stores the information of the first contact point after the time t1 when the first learning is completed.

After the first learning is complete, the engine clutch contact point learning controller 100 may be configured to start the second learning (e.g., learning at about 1 mm/s) at the time tb'. When the second learning is completed at the time t2, the engine clutch contact point learning controller 100 may be configured to delete the information of the first contact point learned by the first learning, and store the information of the second contact point learned by the second learning. Herein, the learning speed of the first learning and the second learning is illustrated at about 4 mm/s or 1 mm/s. However, the present invention is not limited thereto, and these speeds are changeable in various manners based on learning environments.

Figure 6:
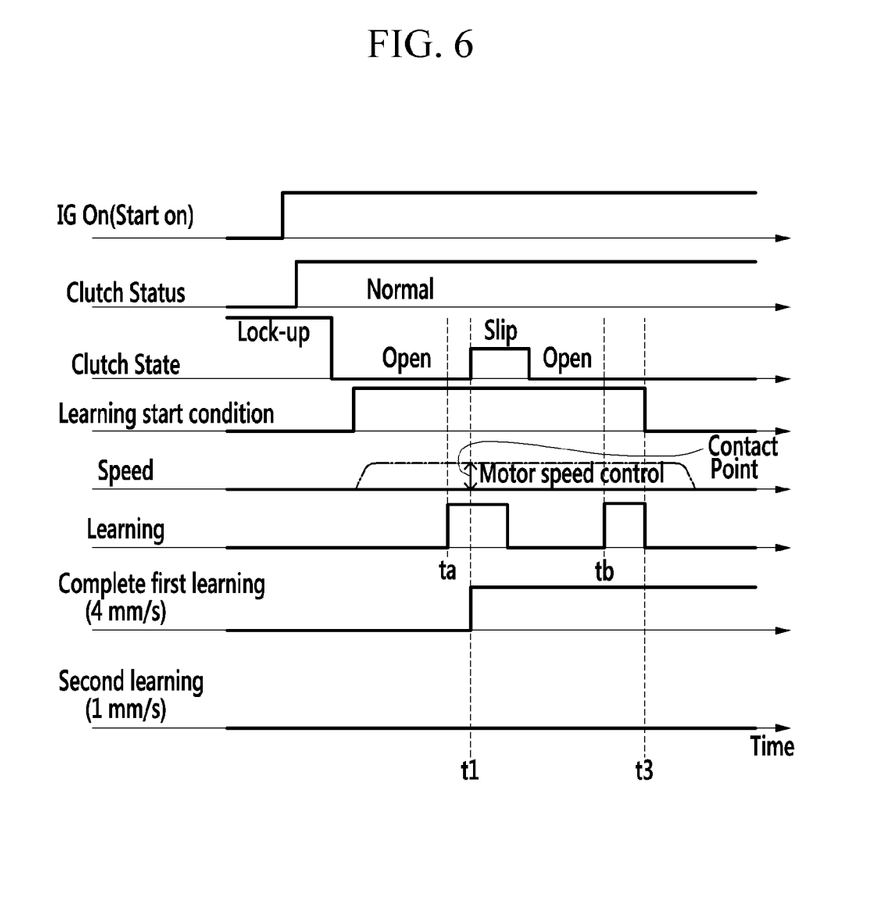
FIG. 6 is a diagram showing another example for learning the contact point of the engine clutch when second learning is stopped according to an exemplary embodiment of the present invention.

FIG. 6 is a diagram showing another example for learning the contact point of the engine clutch when second learning is stopped according to an exemplary embodiment of the present invention. Referring to FIG. 6, the engine clutch contact point learning controller 100 according to an exemplary embodiment of the present invention may be configured to start the first learning (e.g., learning at about 4 mm/s) after the time ta' at which the motor speed is stabilized, and store the information of the first contact point after the time t1 when the first learning is completed.

After the first leaning finished, the engine clutch contact point learning controller 100 may be configured to start the second learning (e.g., learning at about 1 mm/s) at the time tb'. When the second learning is stopped at the time t3, the engine clutch contact point learning controller 100 may not delete the information of the first contact point. The contact point leaning of the engine clutch may be classified into the first learning of fast learning and the second learning of exact learning. The first learning of fast learning prevents the learning from being omitted, and the second learning of exact learning improves the learning accuracy.

Further, the engine clutch contact point learning controller 100 may be configured to perform the first learning when a learning condition is satisfied and perform the second learning when a learning condition is satisfied after the first learning. The engine clutch contact point learning controller 100 may then be configured to store the result of the second contact point by the second learning when both of the first learning and the second learning are completed. When the second learning is stopped or cancelled in the process of the second learning after the first learning is completed, the first contact point may be stored.

As described, the device for learning an engine clutch contact point according to an exemplary embodiment of the present invention may be configured to learn the contact point while varying the learning speed or the learning precision. Therefore, it may be possible to prevent omitting of the learning, and learning accuracy may be improved. The exemplary embodiment of the present invention described above is implemented not only by an apparatus and a method, but also by a program realizing a function corresponding to a configuration of the exemplary embodiment of the present invention or a recording medium recording the program.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for learning a contact point of an engine clutch configured to control connection of power between an engine and a motor of a hybrid vehicle, comprising:
   performing, by a controller, a first learning of the contact point of the engine clutch by increasing a contact speed of the engine clutch;
   storing, by the controller, information of a first contact point learned by the first learning when the first learning is complete;
   performing, by the controller, a second learning of the contact point of the engine clutch by decreasing the contact speed of the engine clutch;
   deleting, by the controller, information of the first contact point when the second learning is complete and storing information of a second contact point learned by the second learning; and
   restarting, by the controller, the first learning when a next driving cycle is started although the second learning is not complete,
   wherein the deleting of the information of the first contact point and the storing of the information of the second contact point includes maintaining the information of the first contact point when the second learning is stopped or cancelled.

2. The method of claim 1, wherein a learning speed of the first learning is faster than a learning speed of the second learning, and learning precision of the second learning is greater than learning precision of the first learning.

3. The method of claim 1, wherein the performing of the first learning or the performing of the second learning includes:
   measuring, by the controller, a load of the engine through motor speed control;
   performing, by the controller, contact of the engine clutch when the motor speed control is stabilized; and
   determining, by the controller, the contact point of the engine clutch when a change of a motor speed or a motor torque is detected.

4. A device for learning an engine clutch contact point of a hybrid vehicle, comprising:
   a power source including an engine and a driving motor;
   an engine clutch disposed between the engine and the driving motor to selectively connect the engine and the driving motor; and
   a controller configured to release or engage the engine clutch to implement a driving mode,
   wherein the controller is configured to:
   perform a first learning of a contact point of the engine clutch by increasing a contact speed of the engine clutch and a second learning of the contact point of the engine clutch by decreasing the contact speed of the engine clutch;

store information of a first contact point learned by the first learning when the first learning is complete;

delete information of the first contact point when the second learning is complete and store information of a second contact point learned by the second learning unit;

restart the first learning when a next driving cycle is started although the second learning is not complete; and maintain the information of the first contact point when the second learning is stopped or cancelled.

5. The device of claim 4, wherein a learning speed of the first learning is faster than a learning speed of the second learning, or learning precision of the second learning is greater than learning precision of the first learning.

\* \* \* \* \*